(12) United States Patent
Chen

(10) Patent No.: US 9,979,216 B1
(45) Date of Patent: May 22, 2018

(54) HIGH-POWER CHARGING PLUG

(71) Applicant: Jui Lung Chen, New Taipei (TW)

(72) Inventor: Jui Lung Chen, New Taipei (TW)

( * ) Notice: Subject to any disclaimer, the term of this patent is extended or adjusted under 35 U.S.C. 154(b) by 0 days. days.

(21) Appl. No.: 15/466,795

(22) Filed: Mar. 22, 2017

(51) Int. Cl.
| | |
|---|---|
| *H02J 7/00* | (2006.01) |
| *B60L 11/18* | (2006.01) |
| *H01R 13/633* | (2006.01) |
| *H01R 13/447* | (2006.01) |
| *H01R 13/502* | (2006.01) |
| *H01R 24/28* | (2011.01) |
| *H01R 107/00* | (2006.01) |

(52) U.S. Cl.
CPC ......... *H02J 7/0045* (2013.01); *B60L 11/1818* (2013.01); *H01R 13/447* (2013.01); *H01R 13/502* (2013.01); *H01R 13/6335* (2013.01); *H01R 24/28* (2013.01); *H01R 2107/00* (2013.01); *H01R 2201/26* (2013.01)

(58) Field of Classification Search
CPC ..... H01R 13/24; H01R 13/6205; H01R 31/06
See application file for complete search history.

(56) References Cited

U.S. PATENT DOCUMENTS

| | | | | |
|---|---|---|---|---|
| 2,302,590 | A * | 11/1942 | Waite | F16B 19/1081 411/80.2 |
| 4,500,160 | A * | 2/1985 | Bertsch | H01R 31/00 439/490 |
| 5,975,820 | A * | 11/1999 | Kirchen | F16B 5/0628 411/339 |
| 7,249,976 | B1 * | 7/2007 | Watson | H01R 13/71 200/51.07 |
| 2003/0207601 | A1 * | 11/2003 | Adachi | H01R 13/443 439/135 |
| 2007/0099458 | A1 * | 5/2007 | Gottstein | H01R 25/006 439/142 |
| 2010/0167580 | A1 * | 7/2010 | Lee | H01R 13/506 439/490 |
| 2012/0238122 | A1 * | 9/2012 | Hirashita | B60L 11/1818 439/304 |
| 2012/0315771 | A1 * | 12/2012 | Greig | H01R 13/6205 439/39 |

* cited by examiner

*Primary Examiner* — Truc Nguyen

(57) ABSTRACT

A high-power charging plug is disclosed. The charging plug comprises a case body having an installation cavity disposed therein, installation holes disposed at both sides thereof, front terminal holes disposed on a front side thereof, and back terminal holes disposed on a back side thereof; a terminal set including a plurality of independent terminals having one-piece front terminals and back terminals, a pull ring component including a pull ring, rivets, and rivet sleeves. The charging plug is not only a plug but also a socket. Another charging plug can be plugged into the socket on the charging plug in use to charge multiple products at the same time. It is convenient and practical.

9 Claims, 7 Drawing Sheets

HIGH-POWER CHARGING PLUG

BACKGROUND OF THE INVENTION (1) Technical Field

The present invention relates generally to the field of charging technology, and more particularly to a high-power (HP) charging plug.

(2) Background Art

With further promotion of environmental conception and the price of crude oil soaring, the mode of a large quantity of vehicles has been shifted from the original petrol-driven to the electricity-driven. Vehicles of low battery require charging to ensure normal operation. Generally, charging plugs of charging piles are used for charging vehicles. Yet, since vehicles require a large amount of electricity, it is necessary to ensure that vehicles can be fully charged within a limited time. When charging a vehicle, an HP charging plug is required because regular charging plugs cannot meet the demand for quick charging. Further, with the existing technology, each charging plug can only charge one single vehicle at a time, instead of charging multiple vehicles at the same time.

Figure 1:
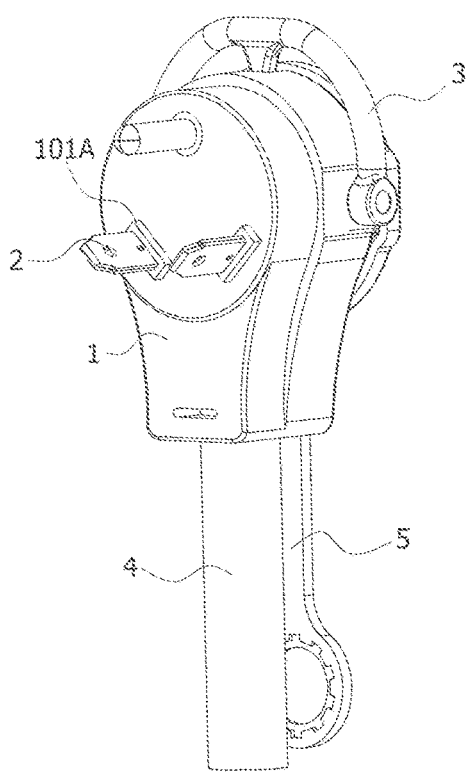
Figure 2:
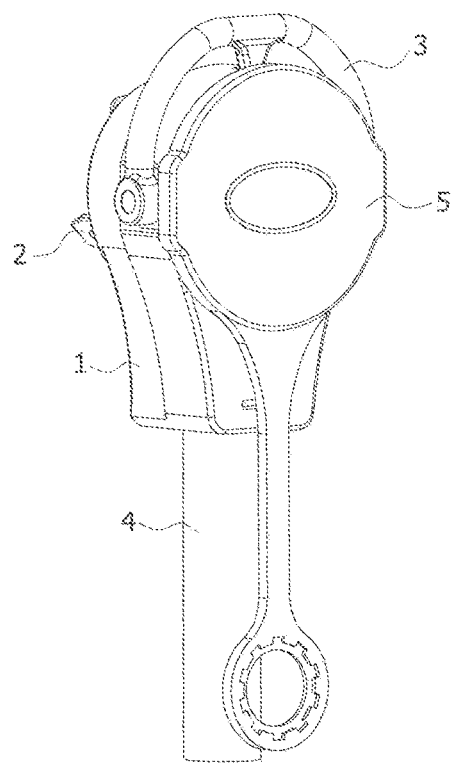

As shown in FIGS. 1 and 2, the new Chinese patent numbered 200520017753.X is a vehicle charging plug. The plug has a hollow case comprised of a top case, a bottom case and two base blocks with the top case and the bottom case connecting to each other and forming a cavity while the case body has two butt joints on both sides with a "U" shaped pull ring across the top of the case and the threaded section of a pin through the pin holes on both sides of the pull ring and inserted into the screw holes of the base blocks installed in the pore of the bottom case and limited with the case body; from the description above, it is known that the pull ring is connected to the case body with the threads between the threaded section and the base blocks connected to the pin and said assembly method is relatively complicated with the thread connection having poor fixation property and a high risk tendency of falling off.

In said patent, there are conductive parts in the case body and these conductive parts are exposed through the holes on the case body to form the plug, which is a common structure of plug that enables the plug being inserted in and charging vehicles one by one. It is impossible to apply such plug to the charging pile to charge vehicles one by one or realize one-to-many charging.

BRIEF SUMMARY OF THE INVENTION

The utility model aims at overcoming the shortcomings of the prior art and providing a high-power charging plug, comprising: a case body, having an installation cavity disposed therein, installation holes disposed at both sides thereof, front terminal holes disposed on a front side thereof, and back terminal holes disposed on a back side thereof; a terminal set, including a plurality of independent terminals having one-piece front terminals and back terminals, the terminals installed in the installation cavity, the front terminals forming a plug by stretching from the front terminal holes on the case body and the back terminals forming a socket by being hidden in the back terminal holes; a pull ring component including a pull ring, rivets, and rivet sleeves; the rivet sleeves installed in the case body, the rivets going through the pin holes on both sides of the pull ring and attached to the rivet sleeves in the installation holes and the pull ring fixed on the case body and being able to rotate.

More preferably, wherein the case body includes an outer case and an inner case matching with each other in shape, the outer case and the inner case respectively having the front terminal holes and back terminal holes; the inner case includes a front case body and a back case body connected to each other, the back case body having terminal slots for insertion of terminals and connected to the front and back terminal holes.

More preferably, wherein the outer case has installation holes, each installation hole on the inner case having a boss with a round hole, the installation hole being smaller than the round hole in diameter and the rivet sleeves installed into the round holes to prevent them from falling off from the installation holes.

More preferably, wherein the terminal is made of a piece of folded terminal sheet with one end used as the front terminal and the other end as the back terminal.

More preferably, wherein the joint of the back terminal and the from terminal forms a convex enclosing and stretching backward to form an elastic part; the end of the back terminal forms a splayed connector.

More preferably, wherein the terminal comprises a cylindrical front terminal and a rectangular back terminal, the end of the front terminal having a cross slot and the back terminal forming a connector.

More preferably, wherein the joint of the front terminal and back terminal extends downward and forms an extended leg, the extended leg forming a "U" shaped terminal leg and the terminal leg being limited out of the terminal slot.

More preferably, wherein the rivet sleeve has a bulge loop, the bulge loop dividing the rivet sleeve into a cylindrical cavity and a conical cavity, said rivet having a tip and a circular groove around the circumference of the rivet aligned with the bulge loop, the rivet being pressed into the rivet sleeve from the conical cavity for spacing with the bulge loop and the circular groove; the inner wall of the conical cavity has cutaway grooves.

More preferably, wherein the case body has a removable protective cover disposed on the back thereof, the protective cover including a cover fastened at the back of the case body and a bolting ring, the cover and bolting ring being connected with a link belt, the protective cover being installed above the wires of the case body with the boiling ring, the inner wall having a convex matching with the shape of the back terminal hole at the back of the case body.

More preferably, wherein the case body having a bottom connected with wires.

Compared to the previous technologies, the present invention has the following functions:

1. The case body of the present invention has a pull ring component that is comprised of a pull ring, rivets and rivet sleeves. The pull ring is connected to both sides of the case body with the rivets and rivet sleeves, making the assembly easier and offering a strong structure. It is more convenient to pull out the charging plug with the pull ring which also prevents the pull ring from falling off in case of strong pull;

2. The charging plug is not only a plug but also a socket. Another charging plug can be plugged into the socket on the charging plug in use to charge multiple products at the same time. It is convenient and practical;

3. The terminal set of the present invention is an integrated part comprised of front terminals forming a plug and back terminals used as a socket for conductivity. In addition, the one-piece structure of the front and back terminals can prevent the charging plug from being damaged due to strong pulling and insertion and effectively ensure a long service life of the charging plug.

BRIEF DESCRIPTION OF THE SEVERAL VIEWS OF THE DRAWING(S)

Figure 3:
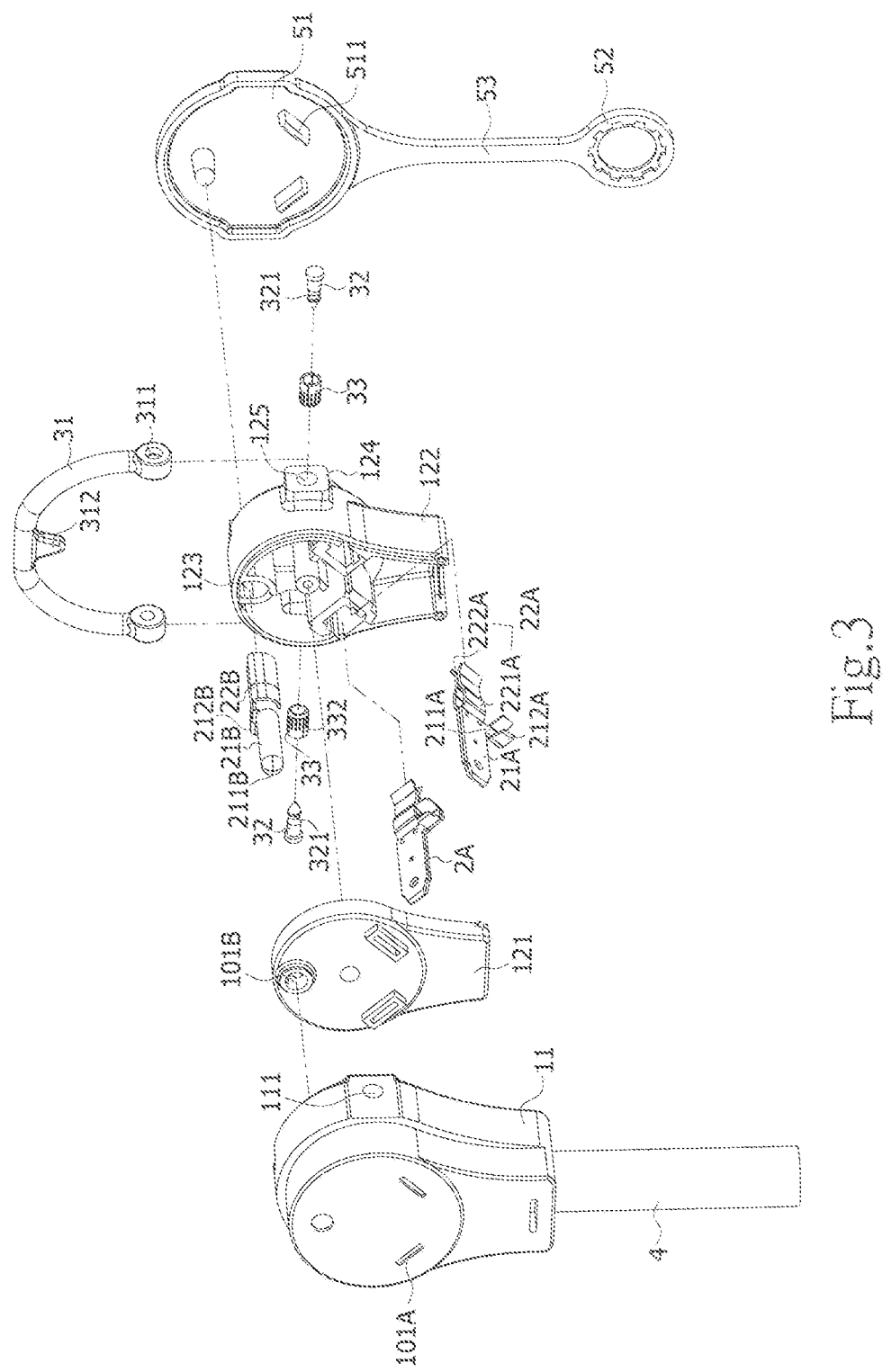
Figure 4:
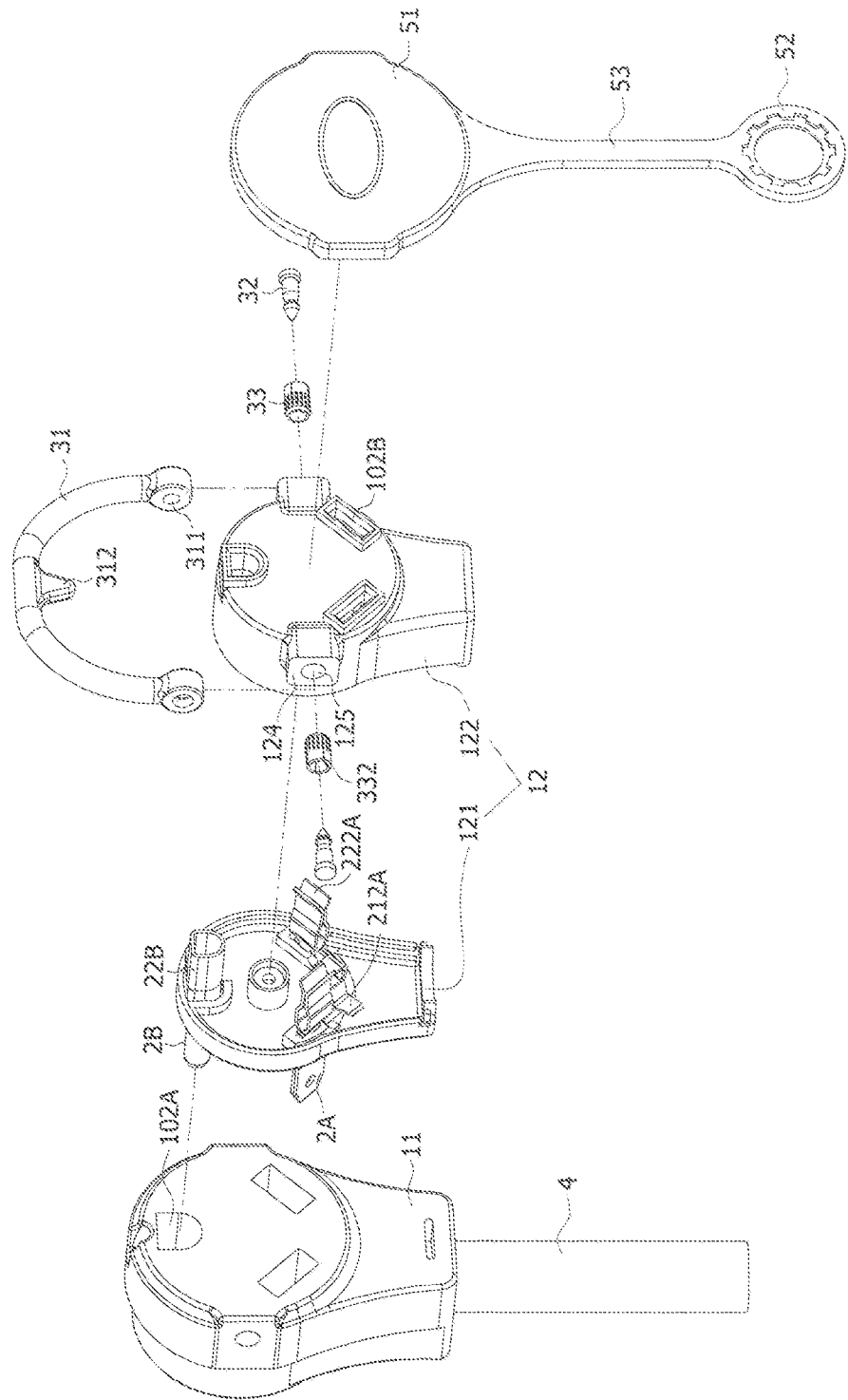
Figure 5:
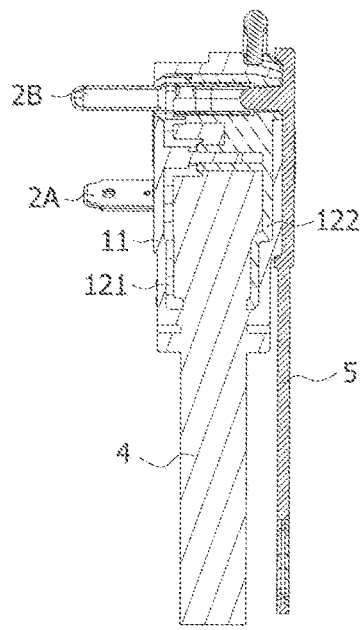
Figure 6:
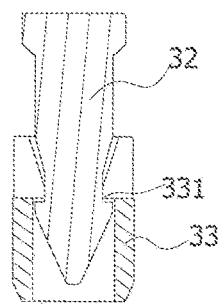
Figure 7:
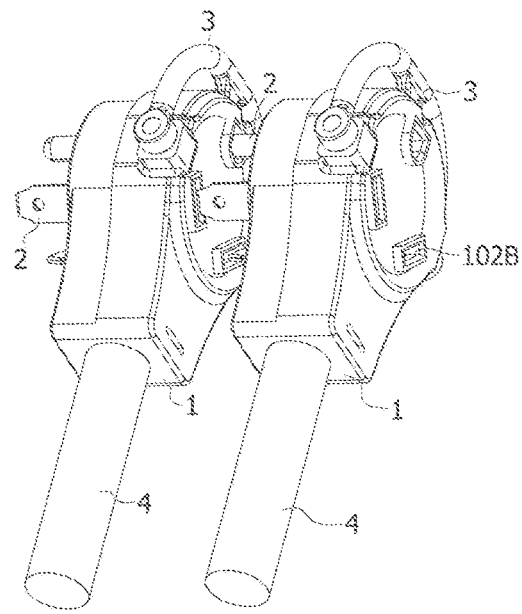
Figure 8:
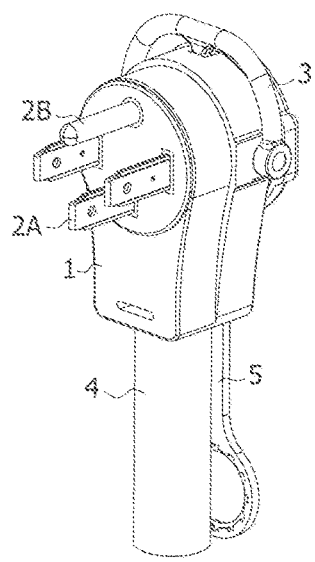
Figure 9:
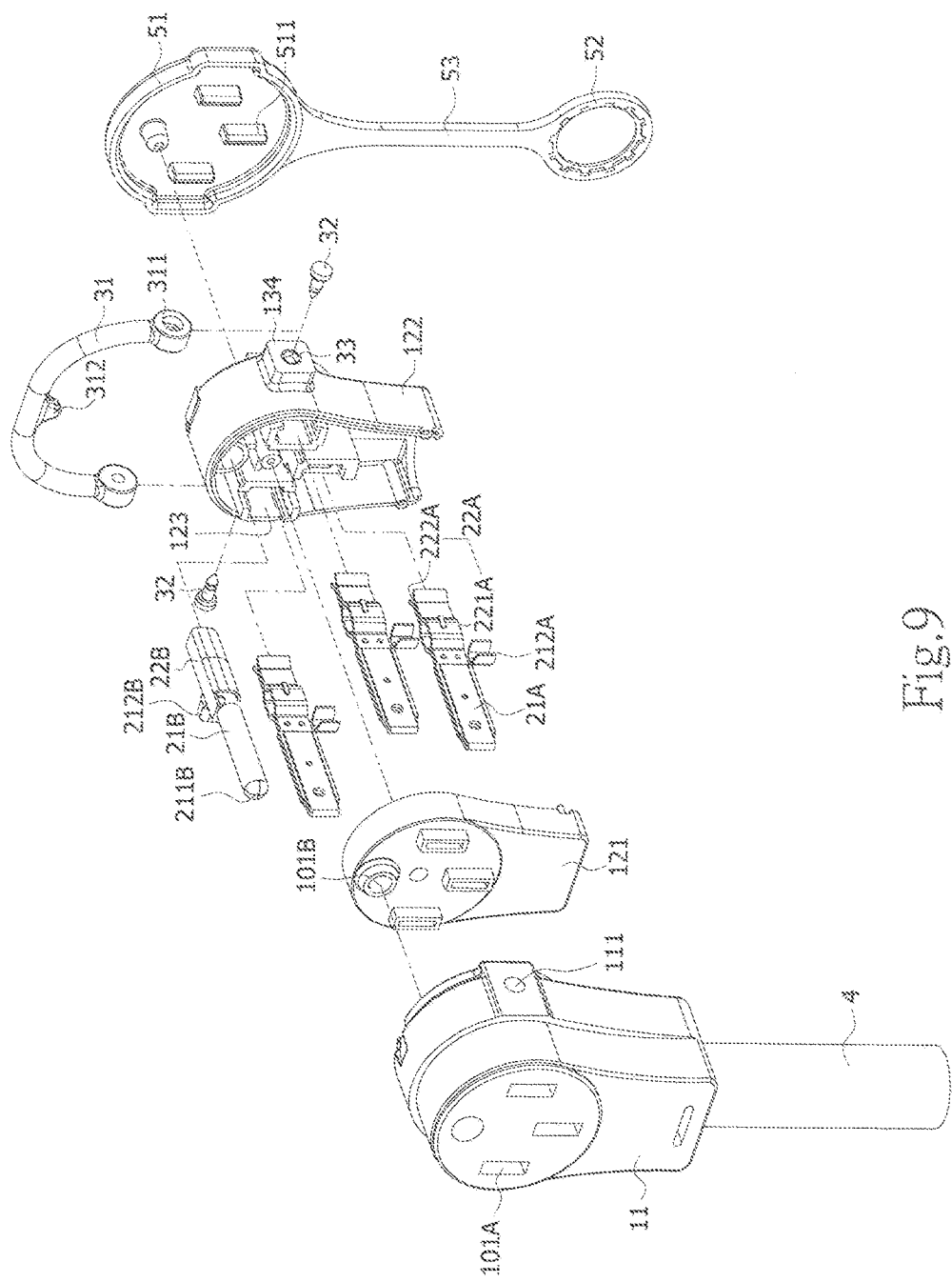
Figure 10:
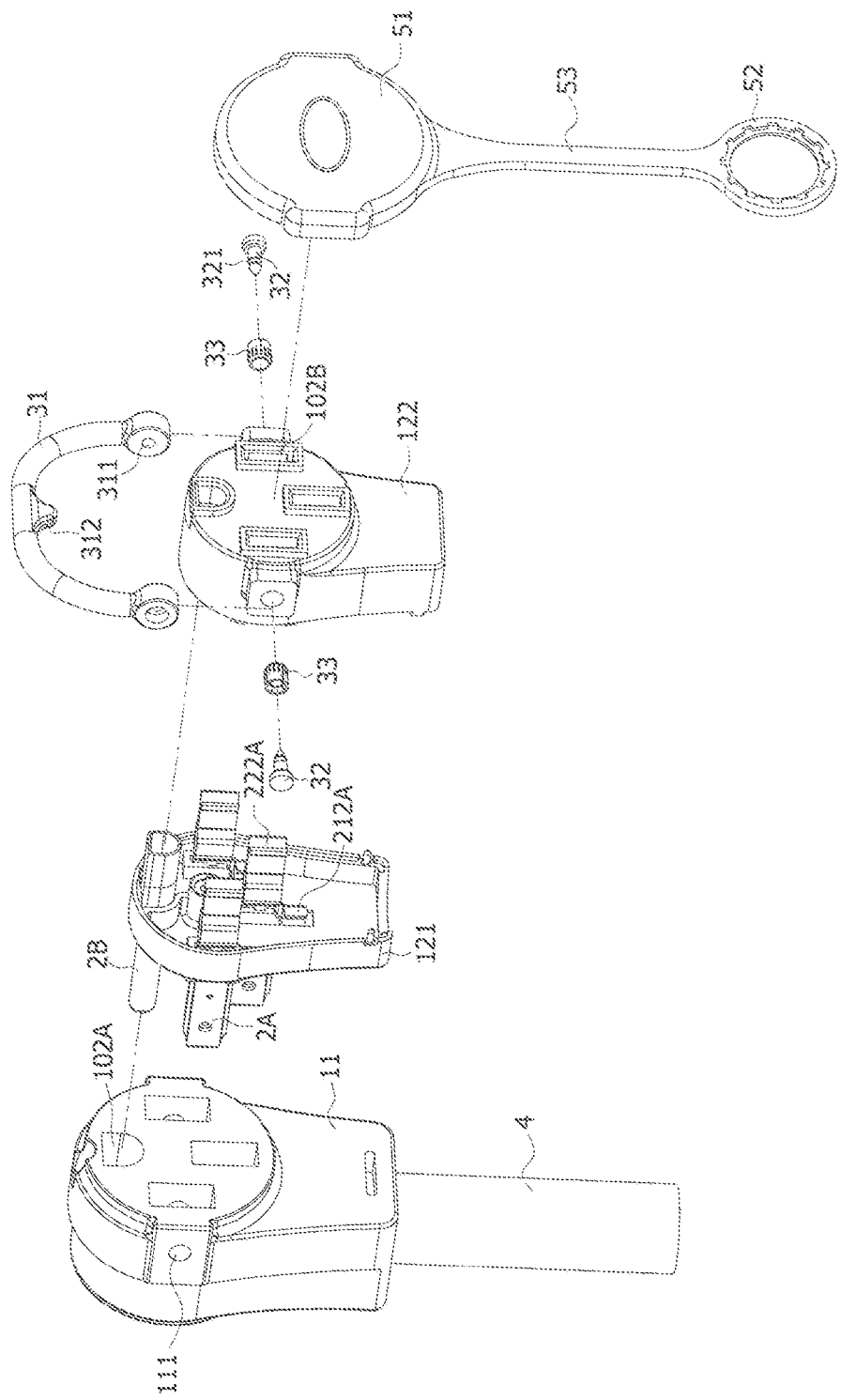

FIG. 1 is an elevation view of a first embodiment;
FIG. 2 is an elevation view of the first embodiment from another angle;
FIG. 3 is an exploded view of the first embodiment;
FIG. 4 is another exploded view of the first embodiment;
FIG. 5 is a cross sectional view of the first embodiment;
FIG. 6 is a sectional view of a rivet sleeve and rivet of the first embodiment;
FIG. 7 is a schematic view of two charging plugs of the first embodiment in tandem connection;
FIG. 8 is an elevation view of a second embodiment;
FIG. 9 is an exploded view of the second embodiment;
FIG. 10 is another exploded of the second embodiment.

SUMMARY OF THE PRESENT INVENTION

Further explanation will be given with the following Figures.

As shown in FIGS. 1 and 2, described is an HP charging plug comprised of: a case body 1, a terminal set 2 installed in the case body 1 and pull ring component 3 across the case body 1.

As shown in FIGS. 3, 4 and 5, said case body 1 has an outer case 11 and an inner case 12 that match with each other in shape with the inner case 12 installed in the outer case 11 and an interface of wires 4 installed at the bottom of the outer case 11 and inner case 12 while the wires 4 and the terminal set 2 have electrical connection. The inner case 12 is installed in the outer case 11 and there is space in the inner case 12 for the installation of terminal elements 2. The front and back of the outer case 11 and the inner case 12 have front-terminal holes 101A, 101B and back-terminal holes 102A, 102B, respectively.

The outer case 11 has installation holes 111 on both sides while the inner case 12 has a pair of bosses 124 on both sides aligned with the installation holes 111 with each boss 124 has a round hole 125 on it. When the outer case 11 and the inner case 12 are connected, thee installation holes 111 will be aligned with the round holes 125 and the installation holes 111 are smaller than the round holes 125 in diameter. When the rivet sleeves 33 of the pull ring 3 are inserted into the round holes 125, because the installation holes 111 are smaller than the round holes 125 in diameter, the rivet sleeves 33 will be limited to the round holes 125 and cannot be separated from the installation holes 111. Said pull ring component 3 is comprised of: an approximate "U" shaped pull ring 31, rivets 32 and rivet sleeves 33 with the pull ring 31 having pin holes 311 on both sides and a downward fin 312 in the middle of the pull ring 31; as shown in FIG. 6, said rivet sleeves 33 are hollow sleeves with each internal rivet sleeve 33 having an inward projection and forming a bulge loop 331 along the circumferential surface. With the bulge loop 331, the rivet sleeve 33 is divided into a cylindrical cavity and a conical cavity. The cross profile of rivet 32 is of "T" shape with the front as the tip. In addition, the circumference of the tip of rivet 32 has a circular groove 321 aligned with the bulge loop 331 and the rivets 32 are pressed into the rivet sleeves 33 from the conical cavities for spacing with the bulge loops 331 and the circular grooves 321; the inner wall of conical cavity has cutaway grooves 332 and the design purpose of the cutaway grooves 332 is to make it more convenient when the rivet 32 is inserted into the rivet sleeve 33 despite the mutual extrusion between the rivet 32 and rivet sleeve 33 and the deformation and expansion of rivet sleeve 33.

During assembly, the rivet sleeves 33 are installed into the round holes 125 on the bosses 124 from outside to inside and the inner case 12 is installed into the outer case 11 with the installation holes 111 of the outer case 11 adjusting the spacing of the rivet sleeves 33 and the rivets 32 through the pin holes 311 on both sides of the pull ring 31 before inserted into the installation holes 111 and pressed into the rivet sleeves 33 to achieve stable connection between the pull right 31 and case body 1. When in use, the charging plug can be pulled out with the pull ring 31.

The outer case 11 has a slot aligned with the fin 312 at the top and the slot is designed for storing the fin 312 and restraining the rotation angle of the pull ring 31 so that it can only rotate backward instead of rotating forward in front of the charging plug.

As shown in FIGS. 2 and 3, the terminal set 2 comprises several independent terminals. Considering the specifications of sockets in different countries, the quantity and shape of terminals differ. In this embodiment, the charging plug is a three-pin plug and the terminal set 2 is a three-pin plug comprised of three terminals including two first terminals 2A and one second terminal 2B. The first terminal 2A is comprised of: an one-piece front terminal 21A and back terminal 22A and the first terminal 2A is made of a piece of folded terminal sheet with one end of the folded terminal sheet comprising said front terminal 21A and the other end forming said back terminal 22A with the front terminal 21A in a flat shape and the joint of the back terminal 22A and front terminal 21A a convex enclosing and stretching backward to form an elastic part 221A on the back terminal; The end of the back terminal 221A is a splayed connector 222A. The joint of the front terminal 21A and the back terminal 22A extends downward and forms an extended leg 211A. On the extended leg 211A, then is a "U" shaped terminal leg 212A. Said second terminal 2B comprises a cylindrical front terminal 21B and a rectangular back terminal 22B that form an integrated pail with the front terminal 21B having a cross slot 211B at the end and back terminal 22B forming a connector 221B; at the joint of the front terminal 21B and the back terminal 22B, there is a "U" shaped terminal leg 212B. During assembly, the first terminals 2A and the second 2B are inserted into the front case body 121 of the inner case 12 through the front terminal holes 101B while the front terminals 21A and back terminal 21B are inserted into the front case body 121 from the back to the front with the front terminals 21A with the back terminal 21B stretching out from the front terminal holes 101B and the back terminals 22A, 22B limited in the terminal slots through the "U" shaped terminal legs 212A, 212B.

Said inner case 12 is comprised of: a front case body 121 and a back case body 122 with the front case body 121 having said front terminal holes 101B on it and the back case body 122 having said back terminal holes 102B on it. There are slots 123 in the back case body 122 designed for insertion of terminals and the slots 123 are connected with the front and back terminal holes respectively.

Before installing said first terminals 2A and second terminal 2B into the front case body 121, the front case body 121 and the back case body 122 should be fastened and connected. The back terminal is inserted into the corresponding terminal slot 123 and the inner case 12 is installed into the outer case 11; upon completion of installation, the front terminals 21A, 21B go through the front terminal holes on the case body 1 at the front to form the plug while the back terminals 22A and 22B are embedded in the back terminal holes to form the socket.

Said case body 1 is equipped with wires 4 at the bottom and the wires 4 are comprised of multiple wire materials, including but not limited to: null line, live wire and earth line. Each wire of the wires 4 are electrically connected to the "U" shaped terminal legs of the first terminals 2A and the second terminal 2B, respectively.

Said case body has a removable protective cover 5 at the back and the protective cover 5 is made of hard plastic or silica gel designed for protecting the socket at the back of the charging plug from moisture or dust that shortens the service life of the charging plug. The protective cover 5 is comprised of: a cover 51 fastened at the back of the case body 1 and a bolting ring 52 with the cover 51 and the bolting ring 52 connected with a link belt 53. The inner wall of the cover 51 has a convex 511 matching with shape of the back terminal holes at the back of the case body 1 while the protective cover 5 is installed on the wires 4 of the case body 1 with the bolting ring 52 and the bolting ring 52 has internal gear; when the socket is not in use. the cover 51 is installed at the back of the case body 1. When in use, the cover 51 is removed from the case body 1.

The applied current of the present invention can reach up to 30A and thus it is a high-power charging plug. As shown in FIG. 7, when in use, the charging plug charge vehicles with electricity from the socket at the back of the charging plug, which enables one-to-many charging. Based on said connection method, the present invention provides a solution to the problem of charging multiple vehicles at a time.

Embodiment 2:

As shown in FIGS. 8, 9 and 10, this embodiment is different from the first embodiment in that: the specifications of terminals in the charging plug of this embodiment are different. A three-pin plug is described in the first embodiment while this embodiment introduces a four-pin plug, including three first terminal 2A and one second terminal 2B arranged in the rectangular way. Correspondingly, the outer case 11 and inner case 12 have four holes, including the front terminal holes 101A, 101B and the back terminal holes 102A, 102B; the first terminals 2A and the second terminal 2B have the same structure. The charging plug of this embodiment can applied to the circumstance of a high current up to 50A, which is higher than the maximum current and power applicable to the first embodiment, enabling full charge in a faster manner.

The above only describes some exemplary embodiments of the present invention. Those having ordinary skills in the art may also make many modifications and improvements without departing from the conception of the invention, which shall all fall within the protection scope of the invention.

I claim:

1. A high-power charging plug, comprising:
   a case body, having a mounting cavity disposed therein, mounting holes disposed at both sides thereof, front terminal holes disposed on a front side thereof, and back terminal holes disposed on a back side thereof;
   a terminal set, including a plurality of independent terminals having one-piece front terminals and back terminals, the terminals installed in the installation cavity, the front terminals forming a plug by stretching from the front terminal holes on the case body and the back terminals forming a socket by being hidden in the back terminal holes;
   a pull ring component, including a pull ring, rivets, and rivet sleeves;
   wherein the rivet sleeves is mounted inside the case body, and the rivets pass through pin holes at both ends of the pull ring and are integrally riveted together with the riveting sleeve in the mounting hole, fastening the pull ring to the case body and being able to rotate;
   wherein the rivet sleeve has a bulge loop which divides the rivet sleeve into a cylindrical cavity and a conical cavity; the rivet has a tip disposed at front end thereof and has a circular groove corresponding to the bulge loop on the circumference of the rivet; when the rivet is pressed from one end of the conical cavity into the rivet sleeve, the circular groove of the rivet is fixed in the bulge loop of the rivet sleeve, so that the tip of the rivet is fixed in the cylindrical cavity of the rivet sleeve;
   wherein the rivet sleeve is formed with a plurality of cutting grooves disposed in an inner wall of the conical cavity thereof; when the rivet is inserted into the rivet sleeve, the cutting grooves will cause the rivet sleeve to be expanded and allow the rivet to be smoothly inserted therein.

2. The high-power charging plug defined in claim 1, wherein the case body includes an outer case and an inner case matching with each other in shape, the outer case and the inner case respectively having the front terminal holes and back terminal holes; the inner case includes a front case body and a back case body connected to each other, the back case body having terminal slots for insertion of terminals and connected to the front and back terminal holes.

3. The high-power charging plug defined in claim 2, wherein the outer case has installation holes, each installation hole on the inner case having a boss with a round hole, the installation hole being smaller than the round hole in diameter and the rivet sleeves installed into the round holes to prevent them from falling off from the installation holes.

4. The high-power charging plug defined in claim 1, wherein the terminal is made of a piece of folded terminal sheet with one end used as the front terminal and the other end as the back terminal.

5. The high-power charging plug defined in claim 4, wherein a joint of the back terminal and the front terminal forms a convex enclosing and stretching backward to form an elastic part; the end of the back terminal forms a splayed connector.

6. The high-power charging plug defined in claim 1, wherein the terminal comprises a cylindrical front terminal and a rectangular back terminal, the end of the front terminal having a cross slot and the back terminal forming a connector.

7. The high-power charging plug defined in claim 6, wherein the joint of the front terminal and back terminal extends downward and forms an extended leg, the extended leg forming a "U" shaped terminal leg and the terminal leg being limited out of the terminal slot.

8. The high-power charging plug defined in claim 1, wherein the case body has a removable protective cover disposed on the back thereof, the protective cover including a cover fastened at the back of the case body and a bolting ring, the cover and bolting ring being connected with a link belt, the protective cover being installed above the wires of the case body with the bolting ring, the inner wall having a convex matching with the shape of the back terminal hole at the back of the case body.

9. The high-power charging plug defined in claim 1, wherein the case body having a bottom connected with wires.

* * * * *